(12) United States Patent
Chen et al.

(10) Patent No.: US 10,594,443 B2
(45) Date of Patent: Mar. 17, 2020

(54) TRANSMITTING METHOD, RECEIVING METHOD AND NODES FOR HARQ INFORMATION

(71) Applicant: ZTE CORPORATION, Guangdong (CN)

(72) Inventors: Zewei Chen, Guangdong (CN); Jun Xu, Guangdong (CN); Shuqiang Xia, Guangdong (CN); Jin Xu, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 120 days.

(21) Appl. No.: 15/749,354

(22) PCT Filed: Jul. 7, 2016

(86) PCT No.: PCT/CN2016/089196
§ 371 (c)(1),
(2) Date: Jan. 31, 2018

(87) PCT Pub. No.: WO2017/020679
PCT Pub. Date: Feb. 9, 2017

(65) Prior Publication Data
US 2018/0227085 A1 Aug. 9, 2018

(30) Foreign Application Priority Data
Jul. 31, 2015 (CN) .......................... 2015 1 0466184

(51) Int. Cl.
*H04L 1/18* (2006.01)
*H04L 1/16* (2006.01)
(Continued)

(52) U.S. Cl.
CPC ............ *H04L 1/1812* (2013.01); *H04L 1/003* (2013.01); *H04L 1/0029* (2013.01);
(Continued)

(58) Field of Classification Search
None
See application file for complete search history.

(56) References Cited

U.S. PATENT DOCUMENTS

| | | | |
|---|---|---|---|
| 2006/0048034 A1 | 3/2006 | Cho | |
| 2009/0217119 A1* | 8/2009 | Zhang | H04L 1/1614 714/748 |

(Continued)

FOREIGN PATENT DOCUMENTS

| | | |
|---|---|---|
| CN | 102882663 A | 1/2013 |
| CN | 104285401 A | 1/2015 |
| WO | 2016/126653 A1 | 8/2016 |

OTHER PUBLICATIONS

European Extended Supplementary Search Report dated Jun. 25, 2018 received in European Patent Application No. 16 83 2167.7.
(Continued)

*Primary Examiner* — Anh Ngoc M Nguyen
(74) *Attorney, Agent, or Firm* — Cantor Colburn LLP (57) ABSTRACT

A transmitting method for HARQ information comprising: a first node detecting N transmission blocks received from a second node and generating M bits of HARQ information according to the detection result; the M bits of HARQ information being used to indicate the receiving status of the N transmission blocks; there being M2 bits among the M bits, for indicating the positions of k erroneous transmission blocks in the N transmission blocks, M2≤M; the length type of M2 including a first length type or a second length type; the first length type indicating that the value for M2 is predefined, and the second length type indicating that the value for M2 is determined based on k; and the first node transmitting the HARQ information to the second node. The above technical solution does not require strong correlation (Continued)

A first node detects N transmission blocks received from a second node and generates HARQ information of M bits according to a detected result; wherein the HARQ information of M bits is configured to indicate a receiving status of the N transmission blocks; among the M bits, there are M2 bits configured to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k — 101

The first node transmits the HARQ information to the second node — 102 for the channel, and can conserve transmission resources and improve system throughput while reducing the HARQ information feedback overhead.

20 Claims, 2 Drawing Sheets

(51) Int. Cl.
    *H04L 1/00*     (2006.01)
    *H04L 5/00*     (2006.01)
(52) U.S. Cl.
    CPC .............. *H04L 1/1628* (2013.01); *H04L 1/18* (2013.01); *H04L 1/1861* (2013.01); *H04L 5/0055* (2013.01); *H04L 1/1614* (2013.01)

(56) References Cited

U.S. PATENT DOCUMENTS

2012/0020264 A1* 1/2012 Lehti ..................... H04L 1/0071
                                                                       370/311
2014/0086302 A1* 3/2014 Felix ...................... H04L 1/005
                                                                       375/240

OTHER PUBLICATIONS

International Search Report dated Sep. 28, 2016 issued in PCT/CN2016/089196.

\* cited by examiner

TRANSMITTING METHOD, RECEIVING METHOD AND NODES FOR HARQ INFORMATION

CROSS-REFERENCE TO RELATED APPLICATIONS

This application is a based on International Application No. PCT/CN2016/089196, filed on Jul. 7, 2016, which is based upon and claims priority to Chinese Patent Application 201510466184.5, filed on Jul. 31, 2015, the entire contents of which are incorporated herein by reference.

TECHNICAL FIELD

The present disclosure relates to, but not limited to, wireless communication technology, particularly to a method for transmitting hybrid automatic repeat request (HARQ) information, a method for receiving HARQ information and a node.

BACKGROUND

In order to improve a peak rate and also an experience of a user, a node 1 (e.g., a terminal or a base station) usually receives data transmitted by a node 2 (e.g., a base station or a terminal) over one or more carrier waves or progresses. Correspondingly, the node 1 feeds back hybrid automatic repeat request (HARQ) information to the node 2. The node 1 detects whether a transmission block on every carrier wave/progress is correct or not (a receiving status). If the detection result is correct, then an acknowledgement (ACK) is fed back; otherwise, a negative acknowledgement (NACK) is fed back.

In a long time evolution (LTE) system of a third generation partnership project (3GPP), a terminal (node 1) needs to feed back the HARQ information according to the number of carrier wave(s) configured on a base station (node 2) and a transmission mode of each of the carrier wave(s). When the transmission mode of the carrier wave is a spatial multiplexing mode, e.g., every carrier wave has 2 transmission blocks, each of the carrier wave(s) needs to feed back 2 bits of HARQ information; otherwise, each of the carrier wave(s) needs to feed back 1 bit of HARQ information (every carrier wave has 1 transmission block). For example, assuming that the network provides the terminal with 5 carrier waves and the transmission mode of each of the carrier waves is in the spatial multiplexing mode, then the terminal needs to feed back 10 bits of HARQ information to the network over one uplink sub-frame.

In addition, when the carrier wave mentioned above is in a time division duplexing (TDD) mode, the terminal is further required to feed back HARQ information according to uplink and downlink configurations of this carrier wave. For example, assuming that the network provides the terminal with one TDD carrier wave and that both of the uplink and downlink configurations of the carrier wave have a configuration index 5, then the terminal needs to feedback HARQ information of 9 downlink sub-frames (one transmission block for every sub-frame, totally 9 bits) over one uplink sub-frame. For another example, assuming that the network provides the terminal with 2 TDD carrier waves and that both of the uplink and downlink configurations of the carrier wave have a configuration index 5, then the terminal needs to feedback HARQ information of 18 downlink sub-frames (18 bits) over one uplink sub-frame. However, in 3GPP carrier aggregation enhancement researching programs of related technologies, the node 2 may provide the node 1 with as many as 32 carrier waves; for frequency division duplexing (FDD), it's required to feed back 32 bits of HARQ information in case of non-spatial multiplexing mode, and it's required to feed back 64 bits of HARQ information in case of spatial multiplexing mode; for TDD, the number of bits of the HARQ information required to be fed back is related to the uplink and downlink configuration information. If the number of the uplink and downlink configurations are both 5, then the number of bits of the HARQ information is as many as 288.

In related technologies, for purpose of saving a control signaling overhead and a power consumption, improving a coverage, reducing an implementation complexity and the like, the node 1 usually needs to reduce the number of bits of the HARQ information which is fed back to the node 2. In this regard, it usually adopts a solution of binding the HARQ information of a plurality of transmission blocks in a same, predefined time domain or spatial domain; for example, binding the HARQ information of two transmission blocks in a time domain or a spatial domain of a same carrier wave; if both of the two transmission blocks are detected as being correct, then feeding back 1 bit of ACK; otherwise, feeding back 1 bit of NACK. With such a solution, the overhead of HARQ feedback may be reduced by one half.

However, the related technologies as mentioned above involve several problems. If only one of the above-mentioned, bound transmission blocks is incorrectly received, then it has to retransmit the bound transmission blocks, to be doubly sure, because the node 2 cannot determine which one of the transmission blocks is erroneous according to the HARQ information fed back by the node 1. Such waste of transmission resources may negatively affect a throughput of the downlink system. In addition, an information channel experienced by the bound transmission blocks is required to have relatively stronger correlation, but information channels on different carrier waves usually are independent from each other. In the above-mentioned solution, when the node 2 transmits data to the node 1 over a plurality of carrier waves, if it still adopts the method of binding transmission blocks and binds the HARQ information of a plurality of transmission blocks on a plurality of carrier waves, then the negative effects to the throughput of the system will be further increased.

SUMMARY

Hereinafter, subject matters particularly described in the present disclosure are summarized. The present summary is not intended to define the scope of protection of the appended claims.

The embodiments of the present disclosure provides a method for transmitting HARQ information, a method for receiving HARQ information and a node, which does not require strong correlation for the channel, and can conserve transmission resources and improve system throughput while reducing the HARQ information feedback overhead.

The embodiments of the present disclosure provide a method for transmitting HARQ information, including the steps as follows.

A first node detects N transmission blocks received from a second node and generating M bits of HARQ information according to a detection result; wherein the M bits of HARQ information are used to indicate a receiving status of the N transmission blocks; among the M bits, there are M2 bits used to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k.

The first node transmits the HARQ information to the second node.

Optionally, the length type of M2 is, at least one of: configured by a radio resource control (RRC) signaling transmitted by the second node; configured by a downlink control information (DCI) signaling transmitted by the second node; determined by the first node; predefined; and determined by the first node based on k.

Optionally, if kT1≤k≤kT2, then the length type of M2 is the second length type; if k<kT1 or k>kT2, then the length type of M2 is the first length type; wherein kT1 is a first threshold value, kT2 is a second threshold, kT1 and kT2 both are an integer, and 0≤kT1≤kT2≤N.

Optionally, if the length type of M2 is the first length type, then M2≤N; if the length type of M2 is the second length type and if k≥1, then M2=ceil($\log_2(C_N^k)$), wherein ceil indicates rounding up to an integer.

Optionally, the first threshold value kT1 is notified by a radio resource control (RRC) signaling transmitted by the second node; or, the first threshold value kT1 is notified by a downlink control information (DCI) signaling transmitted by the second node; or, the first threshold value kT1 is determined by the first node based on a preset rule.

The second threshold value kT2 is notified by the RRC signaling transmitted by the second node; or, the second threshold value kT2 is notified by the DCI signaling transmitted by the second node; or, the second threshold value kT2 is determined by the first node based on a preset rule.

Optionally, if M2<M, then an indication domain of M1 bits of the M bits is used to indicate a value of k or indicate the length type of M2, wherein M1=M−M2.

Optionally, if M1>1, then an indication domain of M1 bits is used to indicate a value of k; and if M1=1, then the indication domain of the M1 bits is used to indicate the length type of M2.

The embodiments of the present disclosure provide a method for receiving HARQ information, including the steps as follows.

A second node receives M bits of HARQ information transmitted by a first node; wherein the M bits of HARQ information are used to indicate whether N transmission blocks transmitted to the first node by the second node are correctly received by the first node; among the M bits, there are M2 bits used to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k.

If M2=M, then the second node obtains the M bits of HARQ information through a blind detection and obtaining the positions of the k erroneous transmission blocks indicated by the M2 bits.

If M2<M, then, the second node obtains M1 bits of the M bits by decoding, wherein M1=M−M2, an indication domain of the M1 bits of the M bits is used to indicate a value of k or indicate the length type of M2; and determines the M2 bits according to the M1 bits and obtains the positions of the k erroneous transmission blocks indicated by the M2 bits.

Optionally, the length type of M2 is configured by a radio resource control (RRC) signaling transmitted by the second node, or configured by a downlink control information (DCI) signaling transmitted by the second node, or determined by the first node, or predefined; or determined by the first node based on k.

The embodiment of the present disclosure provides a node, including a detector and a transmitter.

The detector is configured to detect N transmission blocks received from another node and generate M bits of HARQ information according to a detection result. The M bits of HARQ information are used to indicate a receiving status of the N transmission blocks. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k which is the number of the erroneous transmission blocks.

The transmitter is configured to transmit the HARQ information to another node.

Optionally, the length type of M2 is configured by a radio resource control (RRC) signaling transmitted by the another node, or configured by a downlink control information (DCI) signaling transmitted by the another node, or determined by the node; predefined; or determined by the node based on k.

Optionally, if kT1≤k≤kT2, then the length type of M2 is the second length type; and if k<kT1 or k>kT2, then the length type of M2 is the first length type; wherein kT1 is a first threshold value, kT2 is a second threshold, kT1 and kT2 both are an integer, and 0≤kT1≤kT2≤N.

Optionally, if the length type of M2 is the first length type, then M2≤N; if the length type of M2 is the second length type and if k≥1, then M2=ceil($\log_2(C_N^k)$), wherein ceil indicates rounding up to an integer.

Optionally, the first threshold value kT1 is notified by the RRC signaling transmitted by the another node; or, the first threshold value kT1 is notified by the DCI signaling transmitted by the another node; or, the first threshold value kT1 is determined by the node based on a preset rule.

The second threshold value kT2 is notified by the RRC signaling transmitted by the another node; or, the second threshold value kT2 is notified by the DCI signaling transmitted by the another node; or, the second threshold value kT2 is determined by the node based on a preset rule.

Optionally, if M2<M, then an indication domain of M1 bits of the M bits is used to indicate a value of k or indicate the length type of M2, wherein M1=M−M2.

Optionally, if M1>1, then the indication domain of the M1 bits is used to indicate the value of k; and if M1=1, then the indication domain of the M1 bits is used to indicate the length type of M2.

The embodiment of the present disclosure further provides a node, including a receiver and a processor.

The receiver is configured to receive M bits of HARQ information transmitted by another node. The M bits of HARQ information are used to indicate whether N transmission blocks transmitted to another node by the node are correctly received by another node. Among the M bits, there are M2 bits used to indicate positions of k erroneous transmission blocks in the N transmission blocks, M2<M. A length type of M2 includes a first length type or a second length type; the first length type indicates that a value of M2 is predefined, and the second length type indicates that a value of M2 is determined based on k.

The processor is configured to obtain the M bits of HARQ information through a blind detection and obtain the positions of the k erroneous transmission blocks indicated by the M2 bits, if M2=M.

The processor is further configured to: obtain M1 bits of the M bits by decoding if M2<M, wherein M1=M−M2, an indication domain of the M1 bits of the M bits is used to indicate a value of k or indicate the length type of M2; and determine the M2 bits according to the M1 bits and obtain the positions of the k erroneous transmission blocks indicated by the M2 bits.

Optionally, the length type of M2 is configured by a radio resource control (RRC) signaling transmitted by the node; or configured by a downlink control information (DCI) signaling transmitted by the node; or determined by the another node; or predefined; or determined by the another node based on k.

The embodiment of the present disclosure further provides a computer-readable storage medium stored with computer-readable instructions which can implement the above-mentioned method for transmitting HARQ information, when executed.

The embodiment of the present disclosure further provides a computer-readable storage medium stored with computer-readable instructions which can implement the above-mentioned method for receiving HARQ information, when executed.

The embodiments of the present disclosure provide a method for transmitting HARQ information, a method for receiving HARQ information and a node, including: a first node detects N transmission blocks received from a second node and generates M bits of HARQ information according to a detection result; wherein the M bits of HARQ information are used to indicate a receiving status of the N transmission blocks; among the M bits, there are M2 bits used to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k; the first node transmits the HARQ information to the second node. The technical solutions provided by the embodiments of the present disclosure does not require strong correlation for the channel, and can conserve transmission resources and improve system throughput while reducing the HARQ information feedback overhead.

The other features and advantages will be described in the specification hereinafter, and will be partly apparent from the specification or by implementing embodiments of the present disclosure. The aims and other advantages may be achieved with structures particularly described in the specification.

Other aspects will be apparent after reading and understanding the drawings and the detailed descriptions thereof.

BRIEF DESCRIPTION OF THE DRAWINGS

The accompanying drawings constituting a part of the description are provided for further understanding of technical solutions of the present disclosure, and are intended to explain, together with the embodiments of the present disclosure, the technical solutions of the present disclosure but not to constitute any limitation thereto.

DETAILED DESCRIPTION

Hereinafter, the embodiments of the present disclosure will be described in details in conjunction with the accompanying drawings. It should be explained that the embodiments and the technical features thereof in the present disclosure may be combined with each other in any possible manner without confliction.

The steps illustrated in the flow chart of the drawings may be implemented in a computer system such as a set of computer-executable instructions. Moreover, although logical sequence(s) is (are) illustrated in the flow chart, the steps as illustrated or described may be implemented in order(s) different from that set forth herein, under certain circumstances.

Figure 1:
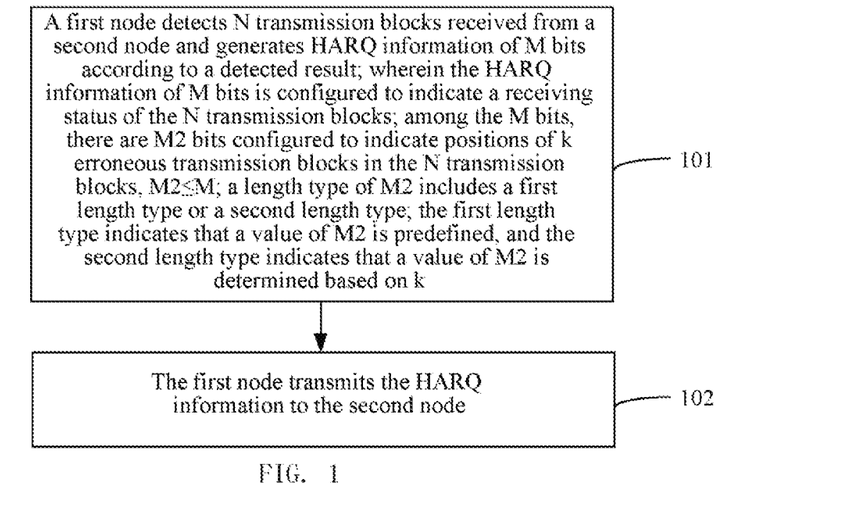
FIG. 1 is a flow chart illustrating a method for transmitting HARQ information provided by an embodiment of the present disclosure.

The embodiment of the present disclosure provides a method for transmitting HARQ information, based on a first node side. As illustrated in FIG. 1, the method includes steps as below.

Step 101, the first node detects N transmission blocks received from a second node and generates M bits of HARQ information according to a detection result; wherein the M bits of HARQ information are used to indicate a receiving status of the N transmission blocks; among the M bits, there are M2 bits used to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k.

Step 102, the first node transmits the HARQ information to the second node.

In the present embodiment, the first node may be a terminal and the second node may be a base station.

Optionally, the length type of M2 is configured by a radio resource control (RRC) signaling transmitted by the second node; or configured by a downlink control information (DCI) signaling transmitted by the second node; or determined by the first node; or predefined; or determined by the first node based on k.

Optionally, when kT1≤k≤kT2, the length type of M2 is the second length type; when k<kT1 or k>kT2, the length type of M2 is the first length type; wherein kT1 is a first threshold value, kT2 is a second threshold, kT1 and kT2 both are an integer, and 0≤kT1≤kT2≤N.

Optionally, when the length type of M2 is the first length type, M2≤N; when the length type of M2 is the second length type and k≥1, $M2=\mathrm{ceil}(\log_2(C_N^k))$, wherein ceil indicates rounding up to an integer.

Optionally, the first threshold value kT1 is notified by the RRC signaling transmitted by the second node; or, the first threshold value kT1 is notified by the DCI signaling transmitted by the second node; or, the first threshold value kT1 is determined by the first node based on a preset rule.

The second threshold value kT2 is notified by the RRC signaling transmitted by the second node; or, the second threshold value kT2 is notified by the DCI signaling transmitted by the second node; or, the second threshold value kT2 is determined by the first node based on a preset rule.

Optionally, when M2<M, an indication domain of M1 bits of the M bits is used to indicate a value of k or indicate the length type of M2, wherein M1=M−M2.

Optionally, when M1>1, the indication domain of the M1 bits is used to indicate the value of k; and when M1=1, the indication domain of the M1 bits is used to indicate the length type of M2.

In the method for transmitting HARQ information provided by the embodiment of the present disclosure, a first node detects N transmission blocks received from a second node and generates M bits of HARQ information according to a detection result; wherein the M bits of HARQ information are used to indicate a receiving status of the N transmission blocks; among the M bits, there are M2 bits used to indicate positions of k erroneous transmission blocks in the N transmission blocks, M2≤M; a length type of M2 includes a first length type or a second length type; the first length type indicates that a value of M2 is predefined, and the second length type indicates that a value of M2 is determined based on k; the first node transmits the HARQ information to the second node. The technical solution of the present embodiment has no strong correlation requirement for information channels and can conserve transmission resources and improve system throughput while reducing the HARQ information feedback overhead.

Figure 2:
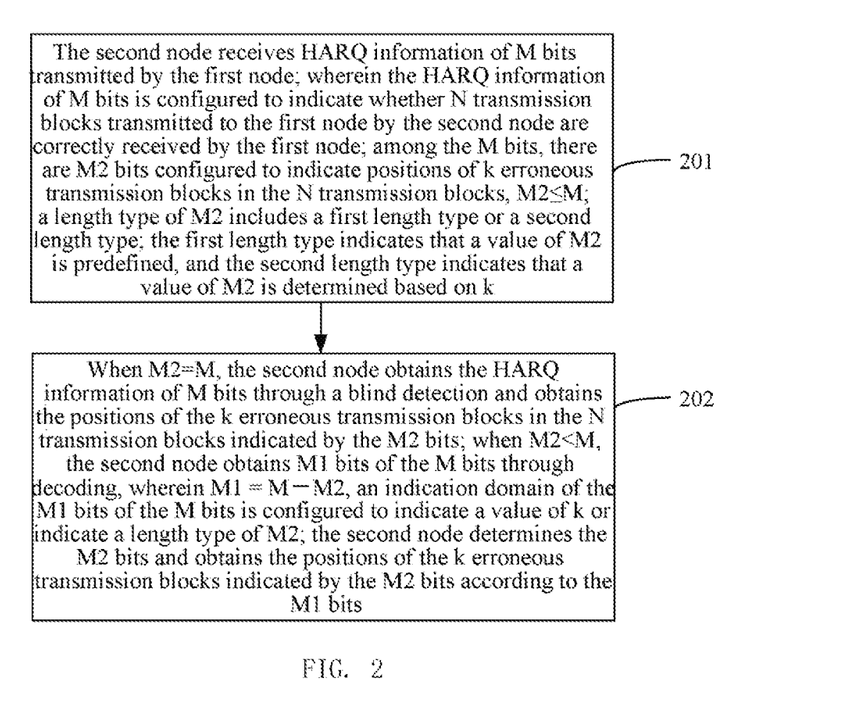
FIG. 2 is a flow chart illustrating a method for receiving HARQ information provided by an embodiment of the present disclosure.

The embodiment of the present disclosure provides a method for receiving HARQ information, based on the second node side. As illustrated in FIG. 2, the method includes steps as below.

Step 201, the second node receives M bits of HARQ information transmitted by the first node. The M bits of HARQ information are used to indicate whether N transmission blocks transmitted to the first node by the second node are correctly received by the first node. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k.

Step 202, when M2=M, the second node obtains the M bits of HARQ information through a blind detection and obtains the positions of the k erroneous transmission blocks in the N transmission blocks indicated by the M2 bits. When M2<M, the second node obtains M1 bits of the M bits through decoding, wherein M1=M−M2, an indication domain of the M1 bits of the M bits is used to indicate a value of k or indicate a length type of M2. The second node determines the M2 bits and obtains the positions of the k erroneous transmission blocks indicated by the M2 bits according to the M1 bits.

It should be noted that, in the present embodiment, the second node may be a base station and the first node may be a terminal.

Optionally, the length type of M2 is configured by a radio resource control (RRC) signaling transmitted by the second node; or configured by a downlink control information (DCI) signaling transmitted by the second node; or determined by the first node; or predefined; or determined by the first node based on k.

In the method for receiving HARQ information provided by the embodiment of the present disclosure, the second node receives M bits of HARQ information transmitted by the first node. The M bits of HARQ information are used to indicate whether N transmission blocks transmitted to the first node by the second node are correctly received by the first node. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k. When M2=M, the second node obtains the M bits of HARQ information through a blind detection and obtains the positions of the k erroneous transmission blocks in the N transmission blocks indicated by the M2 bits. When M2<M, the second node obtains M1 bits of the M bits through decoding, wherein M1=M−M2, an indication domain of the M1 bits of the M bits are used to indicate a value of k or indicate the length type of M2. The second node determines the M2 bits and obtains the positions of the k erroneous transmission blocks indicated by the M2 bits according to the M1 bits. The technical solution of the present embodiment has no strong correlation requirement for information channels and can conserve transmission resources and improve system throughput while reducing the HARQ information feedback overhead.

Figure 3:
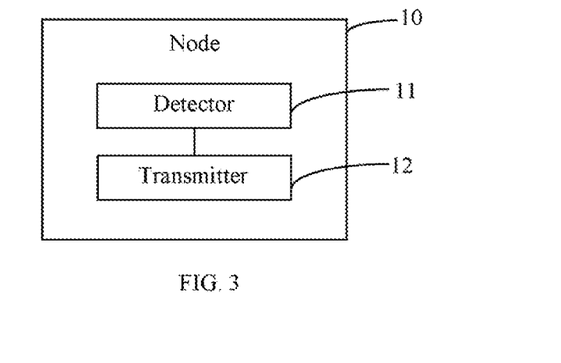
FIG. 3 is a schematic diagram illustrating a structure of a node provided by an embodiment of the present disclosure.

The embodiment of the present disclosure provides a node 10. As illustrated in FIG. 3, the node 10 includes: a detector 11 and a transmitter 12.

The detector 11 is configured to detect N transmission blocks received from another node and generate M bits of HARQ information according to a detection result. The M bits of HARQ information are used to indicate a receiving status of the N transmission blocks. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k, which is the number of erroneous transmission blocks.

The transmitter 12 is configured to transmit the HARQ information to the another node.

It should be noted that, the node 10 may be a terminal, and the another node may be a base station.

Optionally, the length type of M2 is configured by a RRC signaling transmitted by another node; or configured by a DCI signaling transmitted by the another node; or determined by the node; or predefined; or determined by the node based on k.

Optionally, when kT1≤k≤kT2, the length type of M2 is the second length type; when k<kT1 or k>kT2, the length type of M2 is the first length type; wherein kT1 is a first threshold value, kT2 is a second threshold, kT1 and kT2 both are an integer, and 0≤kT1≤kT2≤N.

Optionally, when the length type of M2 is the first length type, M2≤N; when the length type of M2 is the second length type and k>1, M2=ceil($\log_2(C_N^k)$), wherein ceil indicates rounding up to an integer.

Optionally, the first threshold value kT1 is notified by the RRC signaling transmitted by another node; or, the first threshold value kT1 is notified by the DCI signaling transmitted by the another node; or, the first threshold value kT1 is determined by the node based on a preset rule.

The second threshold value kT2 is notified by the RRC signaling transmitted by another node; or, the second threshold value kT2 is notified by the DCI signaling transmitted by the another node; or, the second threshold value kT2 is determined by the node based on a preset rule.

Optionally, when M2<M, an indication domain of M1 bits of the M bits is used to indicate a value of k or indicate the length type of M2, wherein M1=M−M2.

Optionally, when M1>1, the indication domain of the M1 bits is used to indicate the value of k; and when M1=1, the indication domain of the M1 bits is used to indicate the length type of M2.

The present embodiment is to implement any of the foregoing method embodiments. As for working flows and working principles of respective units in the present embodiment, reference may be made to the description of any of the foregoing method embodiments which will not be repeated herein.

The node provided by the embodiment of the present disclosure detects N transmission blocks received from another node and generates M bits of HARQ information according to a detection result. The M bits of HARQ information are used to indicate a receiving status of the N transmission blocks. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k, which is the number of erroneous transmission blocks. The node also transmits the HARQ information to the another node. The technical solution of the present embodiment does not require strong correlation for the channel, and can conserve transmission resources and improve system throughput while reducing the HARQ information feedback overhead.

Figure 4:
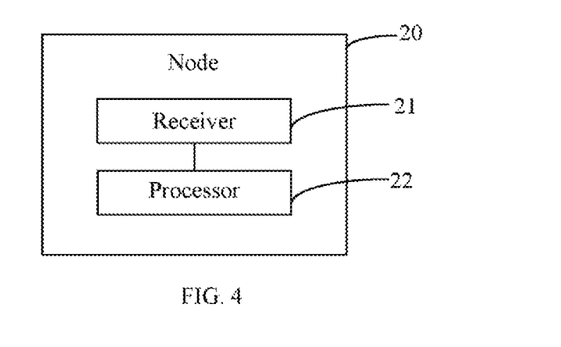
FIG. 4 is a schematic diagram illustrating a structure of another node provided by an embodiment of the present disclosure.

The embodiment of the present disclosure provides another node 20. As illustrated in FIG. 4, the node 20 includes: a receiver 21 and a processor 22.

The receiver 21 is configured to receive M bits of HARQ information transmitted by another node. The M bits of HARQ information are used to indicate whether N transmission blocks transmitted to another node by the node are correctly received by the another node. Among the M bits, there are M2 bits used to indicate positions of k erroneous transmission blocks in the N transmission blocks, M2≤M. A length type of M2 includes a first length type or a second length type; the first length type indicates that a value of M2 is predefined, and the second length type indicates that a value of M2 is determined based on k.

The processor 22 is configured to obtain the M bits of HARQ information through a blind detection and obtain the positions of the k erroneous transmission blocks indicated by the M2 bits when M2=M.

The processor 22 is further configured to obtain M1 bits of the M bits through decoding when M2<M, wherein M1=M−M2, an indication domain of the M1 bits of the M bits is used to indicate a value of k or indicate the length type of M2. The processor determines the M2 bits according to the M1 bits and obtains the positions of the k erroneous transmission block indicated by the M2 bits.

It should be noted that the node 20 may be a base station, and the another node may be a terminal.

Optionally, the length type of M2 is configured by a RRC signaling transmitted by the node; or configured by a DCI signaling transmitted by the node; or determined by the another node; or predefined; or determined by the another node based on k.

The present embodiment is to implement any of the foregoing method embodiments. As for working flows and working principles of respective units in the present embodiment, reference may be made to the description of any of the foregoing method embodiments which will not be repeated herein.

The node provided by the embodiment of the present disclosure receives M bits of HARQ information transmitted by another node. The M bits of HARQ information are used to indicate whether N transmission blocks transmitted to another node by the node are correctly received by the another node. Among the M bits, there are M2 bits used to indicate positions of k erroneous transmission blocks in the N transmission blocks, M2≤M. A length type of M2 includes a first length type or a second length type. The first length type indicates that a value of M2 is predefined, and the second length type indicates that a value of M2 is determined based on k. When M2=M, the node obtains M bits of HARQ information through a blind detection and obtains positions of k erroneous transmission blocks indicated by the M2 bits. When M2<M, the node obtains M1 bits of the M bits through decoding, wherein M1=M−M2. An indication domain of the M1 bits of the M bits is used to indicate a value of k or indicate the length type of M2; the node determines the M2 bits according to the M1 bits and obtains the positions of the k erroneous transmission block indicated by the M2 bits. The technical solution of the present embodiment has no strong correlation requirement for information channels and can conserve transmission resources and improve system throughput while reducing the HARQ information feedback overhead.

Hereinafter the technical solutions provided by the present disclosure will be described in details in combination with specific embodiments.

The First Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment is used to indicate a receiving status of the 16 transmission blocks; the M2 (M2=M) bits are used to indicate position information of k erroneous transmission blocks in the 16 transmission blocks. A length type of M2 is determined based on k, which is the number of erroneous transmission blocks. When it's detected that a first threshold value kT1≤k≤a second threshold value kT2 (assuming that kT1=1 and kT2=4), the length type of M2 is the second length type, the value of M2 is determined based on k, and M2=ceil($\log_2(C_N^k)$), wherein ceil indicates rounding up to an integer; an indication domain of M2 may indicate possible $C_N^k$ positions of the k erroneous transmission blocks in the N transmission blocks (an indication domain of the M2 bits may maximally indicate $2^{M2}$ positions of the k erroneous transmission blocks in the N transmission blocks, and $C_N^k \leq 2^{M2}$ just satisfies the requirement). When it's detected that k>kT2 or k<kT1 (assuming that kT1=1 and kT2=4), the length type of M2 is the first length type, and M2=M=N=16 (in the present embodiment, assuming that M=N) to indicate the positions of the k erroneous transmission blocks in the N transmission blocks.

The node 1 transmits the HARQ information.

It should be explained that, in practical transmission, it's highly possible that the number of erroneous transmission blocks as detected is extremely small in case of low error rate. As a result, when k is smaller than a specific threshold value, the HARQ information is fed back by using $\mathrm{ceil}(\log_2(C_N^k))$ bits rather than N bits, which effectively saves the feedback overhead. In addition, by using M2 bits to indicate the positions of the k erroneous transmission blocks in the N transmission blocks, there is no strong correlation requirement for information channels when it needs to retransmit the data, thereby saving the transmission resources and improve the system throughput.

After receiving the HARQ information from the node 1, the node 2 performs decoding through a blind detection. The blind detection refers to that the node 2 performs decoding on the premise of assuming k as a specific value and correspondingly assuming M as a specific value. If the node 1 adds a cyclic redundancy check (CRC) code to the HARQ information, then the node 2 may judge whether the assumption concerning k and M is feasible by checking through CRC after decoding. If feasible, then the HARQ information as obtained after decoding is just the one as expected; otherwise, repeating the above steps by assuming k as other values until the node 2 is correctly decoded.

The Second Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment are used to indicate a receiving status of the 16 transmission blocks. M2 (M2=M) bits are used to indicate position information of k erroneous transmission blocks in the 16 transmission blocks. A length type of M2 is configured by RRC signaling or DCI signaling transmitted by the node 2. Assuming that k≥1, then the length type of M2 is the second length type, and M2=$\mathrm{ceil}(\log_2(C_N^k))$=M; and assuming that K=0, then the length type of M is the first length type and M2=M=16. It should be explained that, when k>1, the length type of M2 may be configured as the first length type by the signaling.

The node 1 transmits the HARQ information.

It should be explained that, the HARQ information is fed back by using $\mathrm{ceil}(\log_2(C_N^k))$ bits rather than N bits, which effectively saves the feedback overhead. Moreover, the length type of M2 may be configured by the signaling, which increases configuration flexibility.

The Third Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment is used to indicate a receiving status of the 16 transmission blocks; M2 bits are used to indicate position information of k erroneous transmission blocks in the 16 transmission blocks. The length type of M2 is determined by the node 1, assuming that k≥1, then the length type of M2 is the second length type, and M2=$\mathrm{ceil}(\log_2(C_N^k))$=M; and assuming that k=0, then the length type of M is the first length type, and M2=M=16.

The node 1 transmits the HARQ information.

It should be explained that, the HARQ information is fed back by using $\mathrm{ceil}(\log_2(C_N^k))$ bits rather than N bits, which effectively saves the feedback overhead. Moreover, the node 1 holds information concerning whether a detection result of the transmission block is correct or not, and the length type of M2 is flexibly configured by the node 1, which increases the configuration flexibility.

The Fourth Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment is used to indicate a receiving status of the 16 transmission blocks; M2 (M2<M) bits are used to indicate position information of k erroneous transmission blocks in the 16 transmission blocks. In addition, M1 (M1=M−M2) bits are used to indicate a value of k which is the number of the erroneous transmission blocks. The length type of M2 is determined by the number k of the erroneous transmission blocks.

When it's detected that the number k of the erroneous transmission blocks is equal to or greater than a first threshold value kT1 and is equal to or smaller than a second threshold value kT2 (assuming that kT1=1 and kT2=6), the length type of M2 is the second length type, the value of M2 is determined based on k, and M2=$\mathrm{ceil}(\log_2(C_N^k))$; an indication domain of M2 bits may indicate possible $C_N^k$ positions of the k erroneous transmission blocks in the N transmission blocks (an indication domain of the M2 bits may maximally indicate $2^{M2}$ positions of the k erroneous transmission blocks in the N transmission blocks, and $C_N^k 2^{M2}$ just satisfies the requirements); In addition, M1 bits are used to indicate a magnitude of k (in the present embodiment, assuming that M1=3).

A value 000 of M1 bits indicates that k=0, then M2=0; a value 001 of M1 bits is corresponding to k=1, then M2=4 and M2 bits are used to indicate the position of 1 erroneous transmission block in the 16 transmission blocks; a value 010 of M1 bits is corresponding to k=2, then M2=7 and M2 bits are used to indicate the positions of 2 erroneous transmission blocks in the 16 transmission blocks; a value 011 of M1 bits is corresponding to k=3, then M2=10 and M2 bits are used to indicate the positions of 3 erroneous transmission blocks in the 16 transmission blocks; a value 100 of M1 bits is corresponding to k=4, then M2=11 and M2 bits are used to indicate the positions of 4 erroneous transmission blocks in the 16 transmission blocks; . . . a value 110 of M1 bits is corresponding to k=6, then M2=13 and M2 bits are used to indicate the positions of 6 erroneous transmission blocks in the 16 transmission blocks. A value 111 of M1 bits is corresponding to k>kT2 (kT2=6), then the length type of M2 is the first length type, M2=13 (in the present embodiment, assuming that M=N=16, then M2=M−M1=13) and M2 bits are used to indicate the positions of k (k>6) erroneous transmission blocks in the 16 transmission blocks.

The node 1 transmits the HARQ information.

It should be explained that, in practical transmission, it's highly possible that the number of erroneous transmission blocks as detected is extremely small in case of small error rate. As a result, when k is smaller than a specific threshold value, the HARQ information is fed back by using $\mathrm{ceil}(\log_2(C_N^k))$ bits rather than N bits, which effectively saves the feedback overhead. The M1 bits are used to indicate the value of the number k of erroneous transmission blocks, which facilitates the node 2 to obtain the following M2 bits by decoding according to the M1 bits and obtain the position information of erroneous transmission blocks indicated by the M2 bits, faster.

After receiving the HARQ information from the node 1, the node 2 performs decoding. The node 2 firstly decodes M1 bits, and then determines a magnitude of M2 according to the M1 bits, and then decodes M2 bits. Or, the node 2 performs decoding on the premise of assuming k as a specific value and correspondingly assuming M as a specific value. After decoding, the node 2 may judge whether the assumption concerning k and M is feasible through the M1 bits. If so, then the HARQ information as obtained after decoding is just the one as expected; otherwise, repeating the above steps by assuming k as other values until achieving correctly decoding.

The Fifth Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment is used to indicate a receiving status of the 16 transmission blocks; M2 (M2<M) bits are used to indicate position information of k erroneous transmission blocks in the 16 transmission blocks. When a first threshold value kT1≤k≤a second threshold value kT2 (assuming that kT1=1 and kT2=6), M2<M; and M1 (M1=M−M2) bits are used to indicate the value of k which is the number of erroneous transmission blocks; when k>kT2 (kT2=6), M2=M. The length type of M2 is determined by the number k of the erroneous transmission blocks.

When it's detected that the number k of erroneous transmission blocks satisfies the condition where a first threshold value kT1≤k≤a second threshold value kT2 (assuming that kT1=1 and kT2=6), the length type of M2 is the second length type, the value of M2 is determined based on k, and if k≥1, then M2=ceil($\log_2(C_N^k)$); an indication domain of M2 bits may indicate possible $C_N^k$ positions of the k erroneous transmission blocks in the N transmission blocks (an indication domain of the M2 bits may maximally indicate $2^{M2}$ positions of the k erroneous transmission blocks in the N transmission blocks, and $C_N^k \leq 2^{M2}$ just satisfies the requirements); In addition, the M1 bits are used to indicate the magnitude of k (in the present embodiment, assuming that M1=3).

A value 000 of M1 bits indicates that k=0, then M2=0; a value 001 of M1 bits is corresponding to k=1, then M2=4 and M2 bits are used to indicate the position of 1 erroneous transmission block in the 16 transmission blocks; a value 010 of M1 bits is corresponding to k=2, then M2=7 and M2 bits are used to indicate the positions of 2 erroneous transmission blocks in the 16 transmission blocks; a value 011 of M1 bits is corresponding to k=3, then M2=10 and M2 bits are used to indicate the positions of 3 erroneous transmission blocks in the 16 transmission blocks; a value 100 of M1 bits is corresponding to k=4, then M2=11 and M2 bits are used to indicate the positions of 4 erroneous transmission blocks in the 16 transmission blocks; . . . a value 110 of M1 bits is corresponding to k=6, then M2=13 and M2 bits are used to indicate the positions of 6 erroneous transmission blocks in the 16 transmission blocks. When k>kT2 (kT2=6), the length type of M2 is the first length type and M2=M=16 (in the present embodiment, assuming that M=N, and predefining that M2=M when M2 has the first length type), the M2 bits are used to indicate positions of k (k>6) erroneous transmission blocks in the 16 transmission blocks.

The node 1 transmits the HARQ information.

It should be explained that, in practical transmission, it's highly possible that the number of erroneous transmission blocks as detected is extremely small in case of small error rate. As a result, when k is smaller than a specific threshold value, the HARQ information is fed back by using ceil($\log_2(C_N^k)$) bits rather than N bits, which effectively saves the feedback overhead. The M1 bits are used to indicate the value of the number k of erroneous transmission blocks, which facilitates the node 2 to obtain the following M2 bits by decoding according to the M1 bits and obtain the position information of erroneous transmission blocks indicated by the M2 bits, faster.

The Sixth Embodiment

In the present embodiment, it is assumed that the first node is a node 1, the second node is a node 2, N=16, and the 16 transmission blocks are transmitted over different carrier waves.

The node 1 detects the 16 transmission blocks received from the node 2 and generates M bits of HARQ information according to a detection result. The M bits of HARQ information in the present embodiment is used to indicate a receiving status of the 16 transmission blocks, and M2 (M2<M) bits are used to indicate position information of k erroneous transmission blocks in the 16 transmission blocks. In addition, M1 (M1=1) bits are used to indicate the length type of M2. The length type of M2 is determined by the number k of the erroneous transmission blocks.

When it's detected that the number k of the erroneous transmission blocks satisfies the condition where a first threshold value kT1≤k≤a second threshold value kT2 (assuming that kT1=1 and kT2=6), the length type of M2 is the second length type, the value of M2 is determined based on k, and if k≥1, then M2=ceil($\log_2(C_N^k)$); an indication domain of M2 bits may indicate possible $C_N^k$ positions of the k erroneous transmission blocks in the N transmission blocks (an indication domain of the M2 bits may maximally indicate $2^{M2}$ positions of the k erroneous transmission blocks in the N transmission blocks, and $C_N^k \leq 2^{M2}$ may satisfies the requirements); in such case, the value of the M1 bits is 1 and indicates that the length type of M2 is the second length type (assuming that a value 0 of the M1 bits is corresponding to the first length type, and a value 1 of the M1 bits is corresponding to the second length type); actually, it also indicates a value range of k. When k>kT2 (kT2=6), the length type of M2 is the first length type, and M2=12 (in the present embodiment, it's predefined that M2=12), the M2 bits are used to indicate the positions of k (k>kT2, and kT2=6) erroneous transmission blocks in the 16 transmission blocks. In such case, the value of M1 (M1=1 bit) is 0 and indicates that the length type of M2 is the first length type; it actually also indicates the value range of k.

The node 1 transmits the HARQ information.

It should be explained that, in practical transmission, it's highly possible that the number of erroneous transmission blocks as detected is extremely small in case of small error rate. As a result, when k is smaller than a specific threshold value, the HARQ information is fed back by using ceil($\log_2(C_N^k)$) bits rather than N bits, which effectively saves the feedback overhead. The M1 bits are used to indicate the length type of M2, or indicate the value range of the number k of erroneous transmission blocks, which facilitates the node 2 to obtain the following M2 bits by decoding according to the M1 bits and obtain the position information of erroneous transmission blocks indicated by the M2 bits, faster.

To sum up, with the technical solutions provided by the embodiments of the present disclosure, when the number of bits of the HARQ information is extremely great, the feedback overhead can be effectively saved so as to reduce the waste in downlink transmission resources resulted by the method of binding transmission blocks in the related technical solutions; moreover, unlike the method of binding transmission blocks in the related technical solutions, the technical solutions provided by the embodiments of the present disclosure does not require strong correlation for the channel. In a word, with the technical solutions provided by the embodiments of the present disclosure, the control signaling overhead can be reduced, the transmission resources can be saved, and the system throughput can be decreased.

The foregoing device embodiments are merely illustrative, for example, the classification of modules is merely made in terms of logical functions and these modules may be classified differently in practical implementation. On another hand, connections among the modules as illustrated or discussed may be interfaces in electrical, mechanical or other manners. The modules may or may not be physically separated from each other, and may or may not be physical units. It's possible to select part or all of the modules to achieve the objectives of the present disclosure, according to actual demands.

In addition, the functional modules in the embodiments of the present disclosure may be integrated into a single processing module, or may be separate physical units. It's also possible to integrate two or more modules into a single module. The integrated modules mentioned above may be implemented in a form of hardware, or may be implemented in a form of a combination of hardware with software functional module.

The embodiment of the present disclosure further provides a computer-readable storage medium stored with computer-executable instructions which are configured to implement the above-mentioned method for transmitting HARQ information when executed.

The embodiment of the present disclosure further provides a computer-readable storage medium stored with computer-executable instructions which are configured to implement the above-mentioned method for receiving HARQ information when executed.

The above-mentioned, integrated modules implemented in a form of software functional units may be stored in a computer-readable storage medium. The above-mentioned software functional modules may be stored in a computer-readable storage medium and includes several instructions to enable a computer device (it may be a personal computer, a server or a network device) to perform part of steps in the method described in the embodiments of the present disclosure. Moreover, the above-mentioned computer-readable storage medium includes any medium capable of storing program codes, such as USB flash disk, mobile hard disk, read-only memory (ROM), random access memory (RAM), magnetic disk and optical disk. The embodiments of the present disclosure are not intended to be limited to the combination of hardware and software in any specific form.

The foregoing are merely optional embodiments of the present disclosure without constituting the scope of protection thereof. Any person skilled in the art who is familiar with the present field of technology may readily conceive of variations or alternatives within the technical scope revealed in the present disclosure, which variations or alternatives shall also be fallen within the scope of protection of the present disclosure. Therefore the scope of protection of the present disclosure should be defined by the appended claims.

INDUSTRIAL APPLICABILITY

The embodiments of the present disclosure provide a method for transmitting HARQ information, a method for receiving HARQ information and a node, which have no strong correlation requirements for the information channels, and can conserve transmission resources and improve system throughput while reducing the HARQ information feedback overhead.

What is claimed is:

1. A method for transmitting hybrid automatic repeat request (HARQ) information, comprising:
    detecting, by a first node, N transmission blocks received from a second node and generating M bits of HARQ information according to a detection result; the M bits of HARQ information being used to indicate a receiving status of the N transmission blocks; among the M bits, M2 bits being used to indicate positions of k erroneous transmission blocks in the N transmission blocks, M2≤M; a length type of M2 including a first length type or a second length type; the first length type indicating a value of M2 being predefined, and the second length type indicating a value of M2 being determined based on k; and
    transmitting, by the first node, the HARQ information to the second node.

2. The method according to claim 1, wherein the length type of M2 is configured by a radio resource control (RRC) signaling transmitted by the second node; or configured by a downlink control information (DCI) signaling transmitted by the second node; or determined by the first node; or predefined; or determined by the first node based on k.

3. The method according to claim 2, wherein,
    if kT1≤k≤kT2, then the length type of M2 is the second length type; and
    if k<kT1 or k>kT2, then the length type of M2 is the first length type,
    wherein kT1 is a first threshold value, kT2 is a second threshold, kT1 and kT2 both are an integer, and 0≤kT1≤kT2≤N.

4. The method according to claim 1, wherein,
    if the length type of M2 is the first length type, then M2≤N; and
    if the length type of M2 is the second length type and if k≤1, then M2=ceil($\log_2(C_N^k)$), wherein ceil indicates rounding up to an integer.

5. The method according to claim 3, wherein,
    the first threshold value kT1 is notified by the RRC signaling transmitted by the second node; or, the first threshold value kT1 is notified by the DCI signaling transmitted by the second node; or, the first threshold value kT1 is determined by the first node based on a preset rule; and
    the second threshold value kT2 is notified by the RRC signaling transmitted by the second node; or, the second threshold value kT2 is notified by the DCI signaling transmitted by the second node; or, the second threshold value kT2 is determined by the first node based on a preset rule.

6. The method according to claim 1, wherein if M2<M, then an indication domain of M1 bits of the M bits is used to indicate a value of k or indicate the length type of M2, wherein M1=M−M2.

7. The method according to claim 6, wherein
if M1>1, then the indication domain of the M1 bits is used to indicate the value of k; and
if M1=1, then the indication domain of the M1 bits is used to indicate the length type of M2.

8. A method for receiving hybrid automatic repeat request (HARQ) information, comprising:
receiving, by a second node, M bits of HARQ information transmitted by a first node; the M bits of HARQ information being used to indicate whether N transmission blocks transmitted to the first node by the second node be correctly received by the first node; among the M bits, M2 bits being used to indicate positions of k erroneous transmission blocks in the N transmission blocks, M2≤M; a length type of M2 including a first length type or a second length type; the first length type indicating a value of M2 being predefined, and the second length type indicating a value of M2 being determined based on k;
if M2=M, then, obtaining, by the second node, the M bits of HARQ information through a blind detection and obtaining the positions of the k erroneous transmission blocks indicated by the M2 bits; and
if M2<M, then, obtaining, by the second node, M1 bits of the M bits through decoding, M1=M−M2, an indication domain of the M1 bits of the M bits being used to indicate a value of k or indicate the length type of M2; determining M2 bits according to the M1 bits and obtaining the positions of the k erroneous transmission blocks indicated by the M2 bits.

9. The method according to claim 8, wherein the length type of M2 is configured by a radio resource control (RRC) signaling transmitted by the second node; or configured by a downlink control information (DCI) signaling transmitted by the second node; or determined by the first node; or predefined; or determined by the first node based on k.

10. A node, comprising:
at least one processor; and
a memory communicably connected with the at least one processor and configured for storing computer-executable instructions executable by the at least one processor;
wherein the computer-executable instructions when executed by the at least one processor causes the at least one processor to perform;
detecting N transmission blocks received from a second node and generating M bits of HARQ information according to a detection result; the M bits of HARQ information being used to indicate a receiving status of the N transmission blocks; among the M bits, M2 bits bring used to indicate positions of k erroneous transmission blocks in the N transmission blocks, M2≤M; a length type of M2 including a first length type or a second length type; the first length type indicating a value of M2 being predefined, and the second length type indicating a value of M2 being determined based on k; and
transmitting the HARQ information to the second node.

11. The node according to claim 10, wherein the length type of M2 is configured by a radio resource control (RRC) signaling transmitted by the another node; or configured by a downlink control information (DCI) signaling transmitted by the another node; or determined by the node; or predefined; or determined by the node based on k.

12. The node according to claim 11, wherein,
if kT1≤k≤kT2, then the length type of M2 is the second length type;
if k<kT1 or k>kT2, then the length type of M2 is the first length type,
wherein kT1 is a first threshold value, kT2 is a second threshold, kT1 and kT2 both are an integer, and 0≤kT1≤kT2≤N.

13. The node according to claim 10, wherein,
if the length type of M2 is the first length type, then M2≤N; and
if the length type of M2 is the second length type and if k≤1, then $M2=\text{ceil}(\log_2(C_N^k))$, wherein ceil indicates rounding up to an integer.

14. The node according to claim 12, wherein,
the first threshold value kT1 is notified by the RRC signaling transmitted by the another node; or, the first threshold value kT1 is notified by the DCI signaling transmitted by the another node; or, the first threshold value kT1 is determined by the node based on a preset rule; and
the second threshold value kT2 is notified by the RRC signaling transmitted by the another node; or, the second threshold value kT2 is notified by the DCI signaling transmitted by the another node; or, the second threshold value kT2 is determined by the node based on a preset rule.

15. The node according to claim 10, wherein if M2<M, then an indication domain of M1 bits of the M bits is used to indicate a value of k or indicate the length type of M2, wherein M1=M−M2.

16. The node according to claim 15, wherein,
if M1>1, then the indication domain of M1 bits is used to indicate the value of k; and
if M1=1, then the indication domain of M1 bits is used to indicate the length type of M2.

17. A node, comprising:
a receiver configured to receive hybrid automatic repeat request (HARQ) information of M bits transmitted by another node; the M bits of HARQ information being used to indicate whether N transmission blocks transmitted to another node by the node be correctly received by the another node; among the M bits, M2 bits being used to indicate positions of k erroneous transmission blocks in the N transmission blocks, M2≤M; a length type of M2 including a first length type or a second length type; the first length type indicating a value of M2 being predefined, and the second length type indicating a value of M2 being determined based on k;
a processor configured to obtain the M bits of HARQ information through a blind detection and obtain the positions of the k erroneous transmission blocks indicated by the M2 bits if M2=M;
wherein the processor is further configured to: obtain M1 bits of the M bits by decoding if M2<M, wherein M1=M−M2, an indication domain of M1 bits of the M bits being used to indicate a value of k or indicate the length type of M2; and determine the M2 bits according to the M1 bits and obtain the positions of the k erroneous transmission blocks indicated by the M2 bits.

18. The node according to claim 17, wherein the length type of M2 is configured by a radio resource control (RRC)

signaling transmitted by the node; or configured by a downlink control information (DCI) signaling transmitted by the node; or determined by the another node; or predefined; or determined by the another node based on k.

19. The method according to claim 2, wherein, if the length type of M2 is the first length type, then M2≤N; and if the length type of M2 is the second length type and if k≤1, then M2=ceil($\log_2(C_N^k)$), wherein ceil indicates rounding up to an integer.

20. The method according to claim 3, wherein, if the length type of M2 is the first length type, then M2≤N; and if the length type of M2 is the second length type and if k≤1, then M2=ceil($\log_2(C_N^k)$), wherein ceil indicates rounding up to an integer.

\* \* \* \* \*

(12) INTER PARTES REVIEW CERTIFICATE (3797th)

United States Patent  (10) Number: US 10,594,443 K1
Xu et al.  (45) Certificate Issued: Nov. 8, 2024

(54) TRANSMITTING METHOD, RECEIVING METHOD AND NODES FOR HARQ INFORMATION (71) Applicants: Jun Xu; Jin Xu; Zewei Chen; Shuqiang Xia

(72) Inventors: Jun Xu; Jin Xu; Zewei Chen; Shuqiang Xia

(73) Assignee: G+ COMMUNICATIONS LLC

Trial Number:

IPR2022-01598 filed Oct. 4, 2022

Inter Partes Review Certificate for:

Patent No.: 10,594,443
Issued: Mar. 17, 2020
Appl. No.: 15/749,354
Filed: Jan. 31, 2018

The results of IPR2022-01598 are reflected in this inter partes review certificate under 35 U.S.C. 318(b).

INTER PARTES REVIEW CERTIFICATE
U.S. Patent 10,594,443 K1
Trial No. IPR2022-01598
Certificate Issued Nov. 8, 2024

AS A RESULT OF THE INTER PARTES REVIEW PROCEEDING, IT HAS BEEN DETERMINED THAT:

Claims 1, 2, 6, 8-11, 15, 17 and 18 are found patentable.

\* \* \* \* \*